(12) United States Patent
Borole et al.

(10) Patent No.: US 8,597,513 B2
(45) Date of Patent: Dec. 3, 2013

(54) MICROBIAL FUEL CELL TREATMENT OF FUEL PROCESS WASTEWATER

(75) Inventors: Abhijeet P. Borole, Knoxville, TN (US); Constantino Tsouris, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 982 days.

(21) Appl. No.: 12/366,709

(22) Filed: Feb. 6, 2009

(65) Prior Publication Data
US 2010/0200495 A1  Aug. 12, 2010

(51) Int. Cl.
C02F 3/00 (2006.01)
(52) U.S. Cl.
USPC ........... 210/601; 210/243; 210/263; 210/660; 210/663; 429/2; 429/401; 429/512; 429/500; 204/450; 204/456; 204/513; 204/157.15; 204/518
(58) Field of Classification Search
USPC ......... 204/551, 648, 450, 456, 513, 514, 518, 204/193, 194, 155, 156, 157.15, 157.44, 204/164, 165, 168, 173; 210/601, 748.01, 210/660, 663, 669, 758, 760, 243, 263; 429/401, 404, 2, 408, 410, 512, 418, 429/425, 498, 500, 502
See application file for complete search history.

(56) References Cited

U.S. PATENT DOCUMENTS

| | | | |
|---|---|---|---|
| 3,305,399 A | | 2/1967 | Davis et al. |
| 3,331,705 A | * | 7/1967 | Davis et al. .................. 429/2 |
| 3,331,848 A | | 7/1967 | Davis et al. |
| 4,652,501 A | * | 3/1987 | Bennetto et al. ............. 429/2 |
| 6,306,617 B1 | | 10/2001 | Gunzer et al. |
| 6,680,201 B2 | | 1/2004 | Gunzer et al. |
| 2002/0154469 A1 | * | 10/2002 | Shiue et al. ................ 361/502 |
| 2003/0138675 A1 | * | 7/2003 | Cibuzar ....................... 429/2 |
| 2007/0259216 A1 | | 11/2007 | Logan |
| 2007/0259217 A1 | * | 11/2007 | Logan ......................... 429/2 |
| 2008/0090736 A1 | * | 4/2008 | Zhao et al. ................... 506/8 |
| 2008/0248350 A1 | * | 10/2008 | Little et al. ................ 429/21 |
| 2008/0277272 A1 | | 11/2008 | Pierce et al. |
| 2008/0286624 A1 | * | 11/2008 | Lovley et al. .............. 429/27 |

OTHER PUBLICATIONS

Fardeau M. et al., "Isolation From Oil Reservoirs of Novel Thermophilic Anaerobes Phylogenetically Related to *Thermoanaerobacter subterraneus*: Reassignment of *T. subterraneus, Thermoanaerobacter yonseiensis, Thermoanaerobacter tengcongensis* and *Carboxydibrachium pacificum* to *Caldanerobacter subterraneus* gen. nov., sp. nov., comb. nov. as Four Novel Subspecies" *International Journal of Systematic and Evolutionary Microbiology* 54:467-474 (2004).

(Continued)

*Primary Examiner* — Joseph Drodge
*Assistant Examiner* — Cameron J Allen
(74) *Attorney, Agent, or Firm* — Scully, Scott, Murphy & Presser, P.C.

(57) ABSTRACT

The present invention is directed to a method for cleansing fuel processing effluent containing carbonaceous compounds and inorganic salts, the method comprising contacting the fuel processing effluent with an anode of a microbial fuel ell, the anode containing microbes thereon which oxidatively degrade one or more of the carbonaceous compounds while producing electrical energy from the oxidative degradation, and directing the produced electrical energy to drive an electrosorption mechanism that operates to reduce the concentration of one or more inorganic salts in the fuel processing effluent, wherein the anode is in electrical communication with a cathode of the microbial fuel cell. The invention is also directed to an apparatus for practicing the method.

17 Claims, 2 Drawing Sheets

(56) References Cited

OTHER PUBLICATIONS

Lovley D. et al., "Anaerobic Oxidation of Toluene, Phenol, and p-Cresol by the Dissimilatory Iron-Reducing Organism, GS-15" *Applied and Environmental Microbiology* 56(6):1858-1864 (1990).

Morris J.M. et al., "Feasibility of Using Microbial Fuel Cell Technology for Bioremediation of Hydrocarbons in Groundwater" *Journal of Environmental Science and Health Part A* 43:18-23 (2008).

Hu H. et al., "Development of a Continuous Flow Microbial Fuel Cell Reactor for Hydrogen Production from Industrial Biodegradable Material" *Prepr. Pap.-Am. Chem. Soc. Div. Petr. Chem.* 51(1):107-108 (2006).

Angenent L.T. et al., "Molecular Methods in Biological Systems" *Water Environment Research* 77(6):718-779 (2005).

Lovley D. R., "Bug juice: Harvesting Electricity With Microorganisms" *Nature Reviews Microbiology* 4:497-508 (2006).

\* cited by examiner

MICROBIAL FUEL CELL TREATMENT OF FUEL PROCESS WASTEWATER

This invention was made with government support under Contract Number DE-AC05-00OR22725 between the United States Department of Energy and UT-Battelle, LLC. The U.S. government has certain rights in this invention.

FIELD OF THE INVENTION

The present invention relates to the field of wastewater treatment by microbial fuel cells, and more specifically, wherein the wastewater contains significant levels of hydrocarbon compounds and/or metal salts.

BACKGROUND OF THE INVENTION

Oil and natural gas drilling operations use copious amount of water. For example, as much as 25,000 gallons per day can be used for a single well producing natural gas or coalbed methane. In a process for separating bitumen from sand, approximately three cubic meters of water is required to produce one cubic meter of oil. Water is used primarily in water based drilling muds (WBM), which typically include fresh or salt water, a weighting agent (typically, barite or barium sulfate), clay or organic polymers, and various inorganic salts. Effluent water emanating from the drilling operations usually contain significant concentrations of both high-carbon compounds and inorganic (e.g., metal) salts. The total dissolved solids (TDS) in these waters typically range from 1 to 400 g/L. The total oil content can typically range from 40 mg/L to 2,000 mg/L.

The high-carbon compounds are those typically associated with fossil fuels, e.g., aliphatic and aromatic hydrocarbons, such as benzene, toluene, xylenes, polyaromatic hydrocarbons, petroleum fractions, diesel fractions, and organic acids containing four to nine carbon atoms. A significant portion of the high-carbon compounds enter the water stream from the fossil fuel deposit. Even higher concentrations of petroleum products (typically, diesel fuel or mineral oil) can result in the water when petroleum products are incorporated as drilling lubricants.

The metal salts emanate primarily from salts that have been included in the drilling mud or that are leached from subsurface strata. The metal salts include, for example, halides of the alkali and alkaline earth metals (e.g., NaCl, KCl, $MgCl_2$, $CaCl_2$), metal sulfates (particularly $BaSO_4$), metal carbonates (e.g., $Na_2CO_3$), metal phosphates, metal nitrates, metal hydroxides, and the like. Additional metals can include arsenic, chromium, cadmium, copper, iron, lead, mercury, nickel, and zinc. In some processes, one or more compounds or materials containing these metals are intentionally added as additives to enhance the drilling process.

Due to the presence of significant levels of petroleum byproducts and metal salts, effluent water resulting from fossil fuel drilling operations is typically unfit for discharge into the environment or for re-use. Currently, no practical technologies exist for cleansing such effluent waters, and therefore, the effluent water is typically accumulated in the vicinity of the rigging operation, or stored in underground wells, or transported to a treatment facility. Storage of effluent waters typically results in the gradual seepage of the contaminants into the environment while also being costly to maintain. Transporting and subsequent treatment of the effluent waters can be prohibitively costly. More recent attempts to cleanse the effluent water on site relies on the intensive use of a non-renewable energy source, e.g., the combustion of a fossil fuel for production of electrical energy to drive a cleaning mechanism, such as reverse osmosis/membrane filtration, electrolysis, freeze-thaw methods, electrodialysis, biofiltration, and formation of hydrates.

Ion exchange is an important technology for the removal of salts and various species of metal ions from produced water. However, membrane fouling has prevented commercial application of this technology. Formation of a layer by suspended solids and colloidal matter on the membrane has been a crucial factor affecting separation of ions. Additionally, coating of the ion exchange membrane by crude oil compounds the problem. Similar problems have been observed with use of reverse osmosis.

Accordingly, there would be a benefit in a method capable of cleansing fuel processing waters of both hydrocarbon byproducts and metal salts. There would be a particular benefit in such a method which is cost efficient, and in particular, where significant cost savings result from use of renewable energy technology. There would be an additional advantage in such a method which does not require transport to a treatment facility, but which can be practiced on site. Such a method would allow fuel processing waters to be safely discharged into the environment or re-used in a cost effective manner.

SUMMARY OF THE INVENTION

The present invention provides a method for cleansing fuel processing wastewater of carbonaceous (particularly hydrocarbon) compounds and inorganic salts using one or more microbial fuel cells (MFCs) electrically coupled to one or more electrosorption units. The invention is also directed to a device (or system) containing an MFC electrically connected to an electrosorption unit. In addition, the invention is directed to methods of operating the MFC-electrosorption unit system for optimal performance.

In a preferred embodiment, the method involves treating the fuel processing water (effluent) with a microbial fuel cell capable of oxidatively degrading one or more carbonaceous compounds, at least a portion of which includes one or more hydrocarbon compounds, at an anode of the microbial fuel cell by microbes in contact with the anode. The oxidative degradation of carbonaceous compounds results in the production of electrical energy. The electrical energy is used to drive an electrosorption mechanism capable of reducing the concentration of one or more inorganic salts in the fuel processing effluent. This treatment results in a simultaneous reduction of the levels of carbonaceous compounds and salts.

In another embodiment, the MFC is operated in such a manner that hydrogen is produced at the cathode during microbial consumption of hydrocarbons and/or carbonaceous materials at the anode. The hydrogen gas can be used for any useful purpose, and more particularly, as a fuel for the production of electricity to power the electrosorption mechanism.

In another embodiment, an MFC or system of MFCs is operated in such a manner that the cathode electrochemically reduces one or more electrochemically reducible species, such as a nitrate, chlorate, or reducible metal species, during microbial consumption of hydrocarbons and/or carbonaceous materials at the anode, and while the MFC, or system of MFCs, also provides electrical power to the electrosorption unit.

Thus, as will be described in further detail below, the method advantageously provides an economical, convenient, and environmentally friendly method for cleansing fuel processing wastewaters of both hydrocarbon byproducts and inorganic salts. The method is additionally amenable to operating on site and can be adapted as a mobile unit, thereby eliminating the requirement for transporting waste to a treatment facility. The invention thereby enables processing waters to be safely discharged into the environment or re-used in a cost effective and environmentally friendly manner.

DETAILED DESCRIPTION OF THE INVENTION

Figure 1:
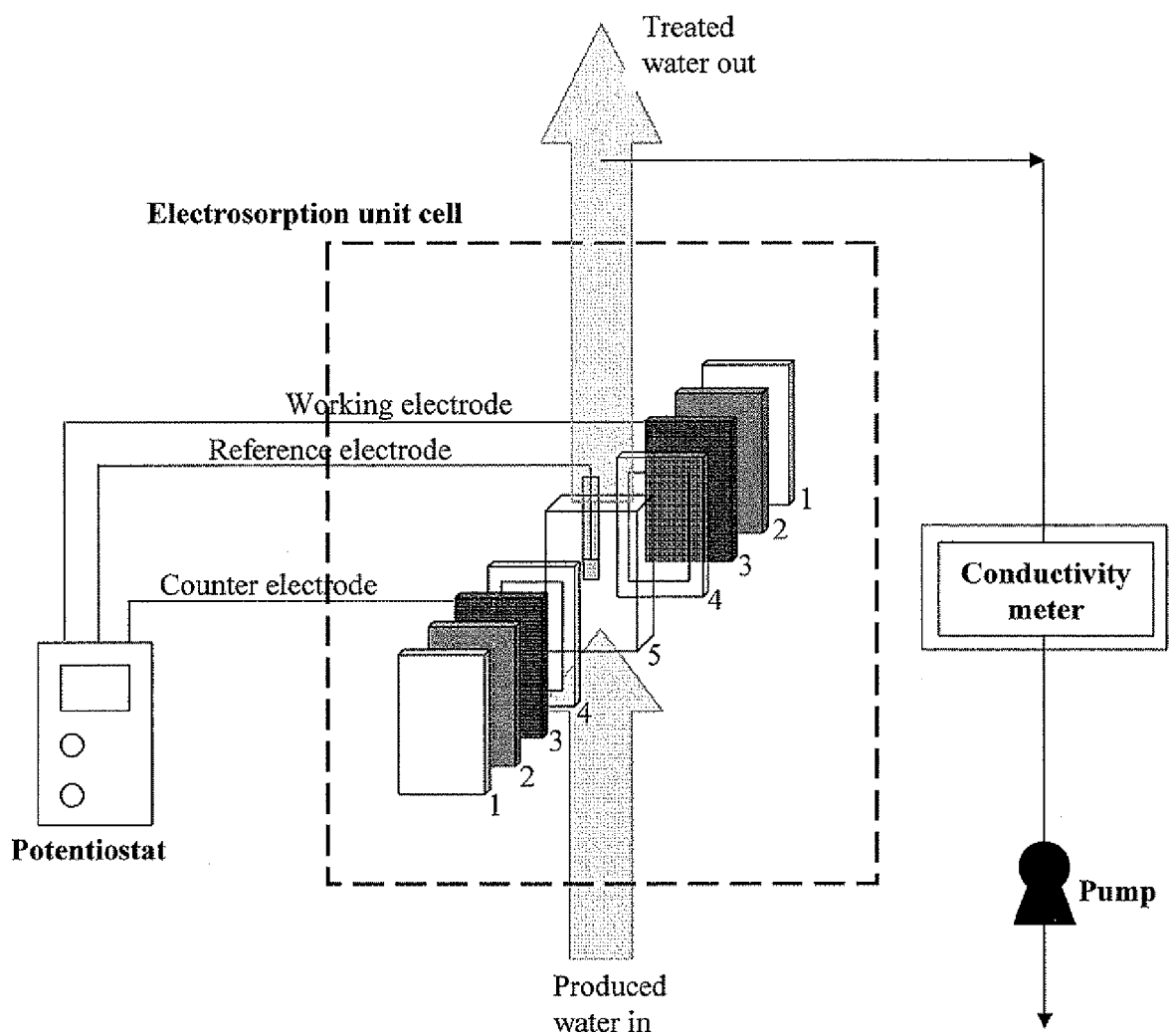
FIG. 1 Schematic diagram showing a preferred design for the electrosorption unit-cell system referred to in the invention.

In one aspect, the invention is directed to a method for cleansing fuel processing water (i.e., "fuel processing wastewater" or "effluent" or "wastewater") by use of a microbial fuel cell (MFC) in electrical communication with an electrosorption device. More specifically, a dual cleansing mechanism is achieved by the consumption (i.e., oxidative catabolism, breakdown, or degradation) of the carbonaceous component of the effluent by microbes housed in the anode portion of the MFC and the removal of inorganic salts by the electrosorption unit which receives electrical energy from the MFC in order to function. The MFC produces electrical energy by the oxidative breakdown of carbonaceous compounds or materials by microbes in the MFC.

By "cleansing" of the effluent is meant that the concentration (i.e., level) of carbonaceous compounds and inorganic salts is reduced to a level such that the wastewater can be discharged into the environment or re-used (e.g., recycled) for the same or other purpose. The combination of carbonaceous compounds and inorganic salts is hereinafter also referred to collectively as "the contaminants". Preferably, the wastewater is cleansed such that the wastewater experiences at least a 20% reduction in one or both of the contaminants. More preferably, the wastewater is cleansed such that the wastewater experiences at least a 30%, or 40%, or 50%, or 60%, or 70%, or 80%, or 90%, or 95% reduction in one or both of the contaminants. Even more preferably, the wastewater is cleansed such that one or both of the contaminants have been substantially removed from the wastewater, i.e., greater than 95% reduction in contaminant concentration (more preferably, at least 98% or 99% reduction in concentration).

The carbonaceous compounds of the effluent are those organic compounds typically associated with fossil fuels and their byproducts. At least a portion of the carbonaceous compounds includes one or more types of hydrocarbon compounds. As used herein, a "hydrocarbon compound" refers to a compound containing solely carbon and hydrogen, unless the presence of heteroatoms is indicated. The hydrocarbon compound can be, for example, saturated or unsaturated, and straight-chained, branched, cyclic, or polycyclic. Typically, the carbonaceous compounds contain at least four carbon atoms. Some examples of applicable straight-chained or branched hydrocarbons include those associated with gasoline range organics (generally, $C_4$-$C_{10}$ alkanes, such as the butanes, pentanes, hexanes, heptanes, octanes, nonanes, and decanes), those associated with diesel range organics (generally, $C_{10}$-$C_{18}$ alkanes), and those associated with high molecular weight saturated and aromatic hydrocarbon polymers (e.g., resins, asphaltenes, and asphalt). Some examples of applicable saturated cyclic or polycyclic hydrocarbons include cyclopentane, cyclohexane, cycloheptane, cyclooctane, dicyclohexyl, decalin, and their alkyl-substituted derivatives. Some examples of unsaturated straight-chained or branched hydrocarbons include the butenes, pentenes, hexenes, heptenes, octenes, nonenes, decenes, butadienes, pentadienes, hexadienes, hexatrienes, and the like. Some examples of unsaturated cyclic hydrocarbons include benzene, toluene, xylenes (o-, m-, or p-), ethylbenzene, isopropylbenzene, and cyclopentadiene. Some examples of unsaturated polycyclic (e.g., polyaromatic) hydrocarbons include naphthalene, anthracene, phenalene, biphenyl, and indene.

The remainder of the carbonaceous compounds can be heteroatom-substituted and contain any number of carbon atoms, but more typically contain at least four carbon atoms. For example, the carbonaceous compounds can include one or more carboxylic acid (carboxylate) compounds. Some examples of applicable carboxylic acid compounds include those containing up to 14 carbon atoms (e.g., acetic, propanoic, butyric, valeric, caproic, caprylic, capric, undecanoic acid, dodecanoic acid, tridecanoic acid, and myristic acid). More typically, the carboxylic acids contain at least 4 and up to about 14 carbon atoms (and more typically, up to about 12, and even more typically, up to about 9 carbon atoms). The carboxylic acids can also include unsaturated carboxylic acids which may be straight-chained, branched, or cyclic (e.g., fumaric, maleic, benzoic, and vegetable-based organic acids). Other heteroatom-substituted carbonaceous compounds include phenols, aldehydes, organoesters, organoamines, or organothiols, particularly those containing at least 4, 5, or 6 carbon atoms.

The inorganic salts of the effluent are typically limited to those salts (i.e., those cations and anions) commonly associated with water-based drilling muds, salt water or sea water (including brine), and salts emanating from earth being drilled. A predominant portion of the inorganic salts is commonly in the form of metal salts. The metal ion of the salt can be any metal ion, but is more typically limited to alkali ions (e.g., $Li^+$, $Na^+$, $K^+$), alkaline earth ions (e.g., $Mg^{2+}$, $Ca^{2+}$, $Sr^{2+}$, $Ba^{2+}$), main group cations (e.g., $As^{3+}$, $Sb^{3+}$, $Pb^{2+}$), and the transition metal ions (particularly, the first row and copper and zinc groups of the Periodic Table). Some examples of transition metals that may be present in the effluent include copper, iron, nickel, chromium, cadmium, zinc, and mercury. Non-metal inorganic cations are also possible and include, for example, ammonium ($NH_4^+$). The anion of the salt can be any anion, but is more typically limited to halide (e.g., fluoride, chloride, bromide, and iodide), sulfate, carbonate, bicarbonate, nitrate, phosphate, hydroxide, and chelating chemicals. The total salt concentration in the raw effluent is typically at least about 10 g/L and up to about 300 g/L.

The effluent being treated can include any of the ingredients commonly used in fossil fuel drilling operations (i.e., the common ingredients found in drilling mud). Typically, water constitutes the largest weight fraction of the drilling mud (e.g., at least 50, 60, or 70%). The mud components typically include a weighting material in next highest amount (e.g., barite, hematite, calcite, or ilmenite), and a viscosifier in next highest amount, e.g., bentonite (e.g., sodium montmorillonite), attapulgite clay, carboxymethyl cellulose or other biological or biodegradable polymer, or a synthetic polymer. Thinners, dispersants, and temperature-stabilizing agents are also commonly used, and include, for example, tannins, polyphosphates, lignite (e.g., leonardite), and lignosulfonates (e.g., chrome and ferrochrome lignosulfonates). Other common ingredients used in drilling mud include flocculants (e.g., inorganic salts, hydrated lime, gypsum, sodium carbonate and bicarbonate, sodium tetraphosphate, and acrylamidebased polymers), filtrate reducers (e.g., sulfonated salts of asphalt or gilsonite), alkalinity adjusting agents (e.g., lime (CaO), NaOH, and $Na_2CO_3$), lubricants (e.g., oils, synthetic liquids, graphite, surfactants, glycols, and glycerin), emulsifiers (e.g., detergents and organic acids), bactericides (e.g., glutaraldehyde), defoamers (e.g., alcohols, silicones, aluminum stearate, and alkyl phosphates), and corrosion inhibitors (e.g., amines and phosphates). Any of the foregoing ingredients can contribute to the carbonaceous component or inorganic salt component of the effluent.

As used herein, and as generally understood in the art, "microbial fuel cells" (i.e., MFCs) are fuel cells which operate by using microbes (i.e., microorganisms) that possess the ability to donate electrons to the anode of the fuel cell by the microbial oxidative degradation of compounds in order to produce electricity. Such microorganisms are known as exoelectrogenic organisms. Exoelectrogenic organisms can donate electrons to the anode in either of two ways: via mediators (e.g., the numerous dyes used in the art for this purpose) or in the absence of mediators (i.e., a mediator-less MFC).

An MFC contains an anode, a cathode, and typically, a porous material (e.g., a membrane) which separates an anode region (which contains the anode) from a cathode region (which contains the cathode). Typically, the porous material is in the form of a cation-selective permeable material (typically, a membrane). The anode and cathode are electrically connected by an electrical conductor (e.g., by a metal wire) held outside of the electrode solutions. The microorganisms in contact with the anode oxidatively catabolize the carbonaceous compounds or materials described above to produce electrons and protons ($H^+$ ions), as well as oxidized organic material or carbon dioxide. The electrons are attracted to the anode and travel to the cathode. At the same time, the produced protons travel through the anodic solution and through the cation-selective permeable material to the cathode. At the cathode, oxygen gas (typically from air) reacts with the electrons and protons to produce water according to the reaction:

$$O_2 + 4H^+ + 4e^- \rightarrow 2H_2O$$

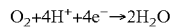

The cation-selective permeable material separating anodic and cathodic regions is also referred to herein as a cation exchange material. The cation-selective permeable material selectively allows the diffusion or passage of cations, such as hydrogen ions ($H^+$, otherwise referred to herein as "protons") while not allowing the passage of anions. The cation-selective permeable material should also substantially prevent oxygen from diffusing from the cathode side into the anode side. A particular type of cation-selective permeable material considered herein is a proton-selective permeable material. The cation-selective or proton-selective permeable material can be any such material known in the art having these properties. Typically, the cation- or proton-selective permeable material is in the form of a membrane, otherwise referred to herein as a cation- or proton-selective permeable membrane or cation or proton exchange membrane (PEM). Any of the PEMs known in the art can be used herein, for example, those belonging to the class of ionomer polyelectrolytes having these properties, such as the Nafion® class of PEMs.

The MFC can have any suitable number of chambers for holding the anodic and cathodic portions of the effluent. For example, the MFC may contain a single chamber wherein anodic and cathodic regions (e.g., solutions) are not separated. Alternatively, the anodic and cathodic media may be separated by an aqueous permeable membrane such as filter paper, cloth, or a specific molecular-weight cut-off membrane, such as a 30 k Dalton cut-off membrane or 0.2 micron membrane. Alternatively, the MFC may contain two separate chambers, wherein the anodic and cathodic solutions are separated while being afforded ionic transport therebetween by, for example, a cation- or proton-selective salt bridge, or a glass bridge containing a cation or proton exchange membrane. In a preferred embodiment, the anode resides in the effluent stream while the cathode is exposed to air or an oxidizing gas while also being in contact with the effluent stream.

The anode can be constructed of any electrically conductive material known in the art suitable for the purposes described herein. The anode material is preferably amenable to the growth and adherence of microbes. Some classes of electrode materials or a coating thereof include conductive metals (e.g., silver, gold, titanium, cobalt, tungsten, stainless steel, and alloys thereof), conductive polymers, or a metal-deposited carbon anode (e.g., Fe-deposited carbon anode). Particularly preferred for the anode are electrodes based on conductive carbon. Typically, any structural form of carbon is suitable as a conductive carbon material. Some examples of carbon electrodes include carbon fiber, carbon paper, carbon foam (e.g., reticulated vitreous carbon), carbon cloth, carbon felt, carbon wool, carbon granules, carbon brushes, graphite, or a combination thereof. The conductive carbon material can have any suitable physical characteristics, such as having a porous, non-porous, powderized, grainy, fibrous, brush, nanotextured, or patterned texture. The conductive carbon material can also be of a less typical form of carbon, such as carbon nanotubes (e.g., single or double walled) or fullerenes. The anode can also have any of the three-dimensional architectures known in the art that are known to possess high porosity values and high flow-through rates. Alternatively, the anode can have a flat (e.g., planar or two-dimensional) topology.

The anode is preferably porous, and in particular, by having a porosity value of at least about 0.3 (and more preferably at least about 0.4, 0.5, 0.6, 0.7, 0.8, or 0.9), wherein the porosity value recited herein is calculated as the volume of void space over the total (i.e., bulk) volume. The foregoing porosity values can be recited as percentages (e.g., 0.3 corresponds to 30%). The anode also preferably possesses sufficient hydraulic conductivity such that the effluent can be processed in a manner that is commercially viable and efficient. For example, it is preferable for the anode to have a hydraulic conductivity of at least 0.5 cm/s, or 1.0 cm/s, or 5.0 cm/s, or 10 cm/s, or 20 cm/s, or 30 cm/s, or 40 cm/s, or 50 cm/s, or 60 cm/s, or 70 cm/s, or 80 cm/s, 90 cm/s, or 100 cm/s, or 110 cm/s, or 120 cm/s.

The anode can also have any suitable shape. The shape of the anode can be, for example, generally planar (e.g., 50 cm×50 cm×5 cm), block-shaped, columnar, spherical (e.g., 4 cm to 40 cm diameter), ovoid, or cuboidal (e.g., 1 cm×1 cm×1 cm or 20 cm×20 cm×20 cm). The anode can also be layered or segregated by containing layers or regions of the same or different anode materials.

For MFCs of the art, the ratio of the total volume of the anode (including void volume inside a porous anode) to the volume of the anode chamber (i.e., the "volume ratio") is typically within the range of 0.1 to 0.4. However, such small volume ratios are often not preferred since they are conducive to the growth of non-exoelectrogenic organisms. It has been found herein that use of higher volume ratios (i.e., greater than 0.4) advantageously encourage the growth of exoelectrogenic organisms. Accordingly, the method, as described herein, is preferably practiced by use of anode volume ratios of at least 0.5, more preferably at least 0.6, more preferably at least 0.7, more preferably at least 0.8, and even more preferably at least 0.9. Even more preferably, the volume ratio is approximately 1 (i.e., at or greater than 0.95), thereby attaining a dead volume of essentially zero in the anode chamber.

The surface area to volume ratio (specific surface area) for the anode can be any suitable value. As understood in the art, the anode volume being considered in calculating specific surface area includes the void space of the anode, and not the volume that the mass of the anode material itself occupies. The specific surface area is typically at least 50 $m^2/m^3$, and more preferably, at least 60 $m^2/m^3$, 70 $m^2/m^3$, 80 $m^2/m^3$, 90 $m^2/m^3$, 100 $m^2/m^3$, 150 $m^2/m^3$, 200 $m^2/m^3$, 250 $m^2/m^3$, 400 $m^2/m^3$, or 500 $m^2/m^3$. Generally, higher specific surface areas (i.e., preferably at least 1,000 $m^2/m^3$) improve the growth of exoelectrogenic organisms and increase power density during operation of an MFC for electricity or hydrogen production. In different embodiments, the higher specific surface area can be, for example, at least 5,000 $m^2/m^3$, 10,000 $m^2/m^3$, 30,000 $m^2/m^3$, 40,000 $m^2/m^3$, 45,000 $m^2/m^3$, or 50,000 $m^2/m^3$. High specific surface areas are preferably attained by use of a carbon felt or three-dimensional anode. Any ranges of specific surface areas resulting from any of the values set forth above are also contemplated herein.

Particularly in the case where the anode is constructed of a hydrophobic type of material (e.g., a carbon form), the anode can be rendered sufficiently hydrophilic to permit favorable interaction (i.e., adherence, interfacing, or bonding) of the anode material with aqueous media. The hydrophilicity can also serve to reduce or prevent agglomeration or sticking of hydrophobic compounds or materials (e.g., hydrocarbons and carbonaceous compounds) to the anode. Any method for coating the surfaces of the anode to render them sufficiently hydrophilic is applicable herein. For example, the anode surface can be powder-coated, spray-coated, or dip-coated with one or more hydrophilic polymeric or molecular materials, and optionally thermally processed, calcined, or dried. The anode can also be chemically treated by an oxidizing agent, such as ozone or hydrogen peroxide. The anode can also be treated by ionizing radiation or an ion beam process for this purpose. In a preferred embodiment, the anode is treated by a plasma process to render its surface hydrophilic. The plasma process is preferably an oxygen plasma process.

The cathode can be constructed of any suitable electrically conductive material, such as any of the materials described above for the anode. The cathode can also have any of the properties (e.g., porosity and hydraulic conductivity values) described above for the anode. In one embodiment, the cathode is any of the gas cathodes known in the art (e.g., a Pt/air electrode). Typically, the gas cathode contains a side which is immersed in the anodic liquid and another side exposed to the gas, which is typically air. The side exposed to the gas typically includes a cathode diffusion layer (CDL) which permits gas to enter but prevents leakage of anodic fluid. In another embodiment, the cathode is any of the ferricyanide electrode systems known in the art. In yet another embodiment, the cathode includes a biological system capable of transferring or utilizing electrons, e.g., a biocathode.

The spacing between the anode and cathode (i.e., the electrode spacing) can be any suitable spacing. In one embodiment, the spacing is within the range of 0 to 1 cm. Smaller electrode spacings (i.e., less than 1 cm) can also be used. For example, in different embodiments, the electrode spacing can be at about or less than 0.8 cm, or 0.5 cm, or 0.25 cm, or 0.1 cm, or 5 mm, or 4 mm, or 3 mm, or 2 mm, or 1 mm, or 0.5 mm. In another embodiment, the electrode spacing is greater than 1 cm, and can be, for example, at or greater than 2 cm, 5 cm, 10 cm, 20 cm, 30 cm, 40 cm, or 50 cm. Particularly where the MFC is used underground where oxygen levels are low, the electrode spacing may be desired to be significantly greater in order that the anode is permitted to function in the substantially anaerobic underground conditions while the cathode is permitted to function above ground where oxygen is plentiful. To accommodate such a set up, the electrode spacing can be, for example, at least 100 cm, 500 cm, 1 m, 2 m, 3 m, 4 m, 5 m, 6 m, 7 m, 8 m, 9 m, 10 m, 15 m, 20 m, or 30 m. Use of such a large electrode spacing can advantageously eliminate the need for in situ aeration of the cathode in underground regions that are low in oxygen.

Preferably, in order to maximize electrical output and provide an efficient system for electricity production, the level of oxygen in the reaction zone of the anode is reduced, and preferably substantially reduced, so as to result in an appreciably anaerobic environment at the anode. Any method for removal and exclusion of oxygen at the anode can be used. In a preferred embodiment, nitrogen sparging of the anodic reaction zone is employed to render the anodic reaction zone substantially anaerobic.

The MFC described herein can have any suitable number of cathodes and anodes. For example, the MFC can be operated with one anode and more than one cathode, or one cathode and more than one anode, or an equivalent number of anodes and cathodes (e.g., two anodes and two cathodes, or three anodes and three cathodes). In addition, the MFC can function monolithically, or alternatively, in a stacked mode in which, for example, 2-250 MFC units are stacked in order to increase electrical power output. Other specifics and modifications known in the art of microbial fuel cell design can be found in, for example, U.S. Application Pub. No. 2007/0259217, which is incorporated herein by reference in its entirety.

The MFC is typically operated within a mild temperature range of about 20 to 50° C. and normal to elevated pressure conditions (i.e., approximately 1 atm or above). However, if thermophilic or hyperthermophilic organisms are used, the operating temperature of the MFC can be higher (e.g., at about or greater than 50° C., or 60° C., or 70° C., or 80° C., or 90° C., or 100° C.). In other embodiments, the MFC can be operated under cooler conditions of less than 20° C., such as a temperature of about or less than 15° C., or 10° C., or 5° C., or 4° C., or 2° C. Operating temperatures of 0° C. or lower are possible depending on the salinity of the flowing medium.

In one embodiment, the microbes (or a portion thereof) interacting with the anode are planktonic, i.e., Rotational. However, planktonic microbes are susceptible to being lost into flowing effluent waters, particularly when the effluent is moving at a high flow rate. To prevent the loss of the microbes into an effluent stream, the planktonic microbes can be contained in a compartment which is permeable to the inflow and outflow of the effluent water and which is non-permeable to the microbes.

In another embodiment, the microbes (or a portion thereof) reside on the anode in the form of a biofilm (i.e., non-planktonic film or mass of microbes). For the purposes of the present invention, a biofilm is preferable since microbes in a biofilm adhere to the anode surface, and are thus significantly less prone to being drawn (and lost) into the flowing effluent. A biofilm of microbes can remain in place with substantially no loss of microbes even at high flow rates.

A biofilm of microbes can be established using any of the methods known in the art. For example, as known in the art, a biofilm of microorganisms can be produced on an anode by initiating a colony of microbes on the anode (i.e., by contact of the anode with the microbes under suitable thriving conditions) and then growing the colony until a biofilm is established on the anode. Preferably, in order to favor growth of exoelectrogenic microbes, the initiation and growth stage is conducted on the anode while the anode is in electrical communication with the cathode. In this way, electrons being donated to the anode from exoelectrogenic microorganisms can be conducted to the cathode.

The biofilm can be initiated by contact of the anode with an anolyte (i.e., either a specially prepared anodic medium or the effluent) that has been inoculated with a sampling of microorganisms, at least a portion of which should be capable of operating by an exoelectrogenic mechanism. Preferably, at some point either at the time of contact, or after contact of the anode with the microorganisms in the anolyte, forced flow and recirculation conditions (i.e., as provided by a pump) are established for the anolyte. For example, in the case of a porous anode, the anolyte is made to flow and recirculate through the anode. A significant portion of microorganisms that do not have a strong propensity for forming biofilms, even though they may be initially associated with the biofilm, will be driven into the anolyte by the flow force. Accordingly, the forced flow and recirculation conditions of the anolyte serve to enrich the biofilm with microorganisms that have a strong propensity for forming biofilms.

In turn, microorganisms with a strong propensity for forming biofilms are more likely to contain pili (nanowires) on their external membrane which can also be used by the microorganisms for direct electron transfer to the anode. Therefore, the forced flow and recirculation conditions of the anolyte can also serve to further enrich the biofilm with exoelectrogenic microorganisms capable of direct electron transfer. At least one advantage of enriching the biofilm with exoelectrogenic microorganisms capable of direct electron transfer is that mediators (e.g., ferric oxides, neutral red, anthraquinone dyes, 1,4-napthoquinone, thionine, methyl viologen, methyl blue, humic acid, ABTS, and the like) are less needed or completely not needed for facilitating electron transfer. A mediator-less system is advantageous in that not only are mediators typically expensive, often toxic, and require replenishment, but mediated electron transfer is typically less efficient than direct (mediator-less) electron transfer.

Preferably, in preparing a biofilm on the anode, the flow rate of the anolyte should be high enough to at least maintain planktonic microorganisms floating in the medium such that they can be eliminated. A suitable flow rate can be, for example, at least about 2 or 3 mL/min. In different embodiments, the flow rate can be either substantially constant or fluctuating within a range of, for example, 2-10 mL/min, or 3-10 mL/min, or 4-10 mL/min, or 5-10 mL/min, or 6-10 mL/min, or 3-8 mL/min, or 3-7 mL/min, or 4-8 mL/min, or 4-7 mL/min. The foregoing flow rates are preferably no more than 10 mL/min and are thus herein referred to as a "low flow rate".

More preferably, in preparing a biofilm on the anode, the flow rate is high enough to render those biofilm-forming microorganisms with a residual level of planktonic ability (i.e., semi-planktonic microorganisms) waterborne (i.e., flotational), and thus, removable, as further described below. This higher flow rate is preferably above 10 mL/min. In different embodiments, the flow rate can be, for example, at least about 12 mL/min, or at least about 15 mL/min, or at least about 20 mL/min, or at least about 25 mL/min, or at least about 30 mL/min, or at least about 35 mL/min, or at least about 40 mL/min, or at least about 45 mL/min, or at least about 50 mL/min. In different embodiments, the higher flow rate can be either substantially constant or fluctuating within a range of, for example, 12-60 mL/min, 12-50 mL/min, 12-40 mL/min, 12-30 mL/min, 12-20 mL/min, 15-60 mL/min, 15-50 mL/min, 15-40 mL/min, 15-30 mL/min, 15-20 mL/min, 20-60 mL/min, 20-50 mL/min, 20-40 mL/min, 20-35 mL/min, 20-30 mL/min, 25-60 mL/min, 25-50 mL/min, 25-40 mL/min, 25-35 mL/min, 25-30 mL/min, 30-60 mL/min, 30-50 mL/min, 30-40 mL/min, 35-60 mL/min, 35-50 mL/min, 35-40 mL/min, 40-60 mL/min, 40-50 mL/min, 45-60 mL/min, 45-50 mL/min, or 50-60 mL/min.

To reflect changes in volume and cross-sectional area of the MFC (i.e., anode), the flow rate can alternatively be represented in terms of space velocity (cm/min) or hydraulic retention time (HRT in units of minutes). To convert flow rates given in units of mL/min into space velocity, the flow rates are divided by the cross-sectional area of the MFC. For example, for a MFC having a cross-sectional area of 1.25 $cm^2$, a flow rate of 2 mL/min corresponds to a space velocity of approximately 1.6 cm/min; a flow rate of 10 mL/min corresponds to a space velocity of 8 cm/min, and a flow rate of 30 mL/min corresponds to a space velocity of 24 cm/min. To convert flow rates given in mL/min into HRT values, the flow rate is inserted into the following equation: HRT=(volume of chamber)/(flow rate in mL/min). For example, for a MFC having a chamber volume of 13.25 mL, a flow rate of 2 mL/min corresponds to a HRT value of approximately 6.6 min.; a flow rate of 10 mL/min corresponds to a HRT value of approximately 1.3 min, and a flow rate of 30 mL/min corresponds to a HRT value of approximately 0.44 min.

In a preferred embodiment for preparing a biofilm on the anode, the anolyte is made to flow at any of the low flow rates or ranges thereof, described above, on a continuous basis (and either a substantially constant or fluctuating basis) along with periodic, intermittent, or occasional interruptions by any of the higher flow rates or ranges thereof described above. For example, in one embodiment, a continuous low flow rate in the range of 2-10 mL/min is periodically interrupted by a higher flow rate. The higher flow rate is preferably any of the higher flow rates described above, and more particularly, a flow rate greater than 10 mL/min, and more preferably, a flow rate of or greater than 12 or 15 mL/min. In a particularly preferred embodiment, the higher flow rate is at least about 35 mL/min. In another embodiment a continuous low flow rate in the range of 3-10 mL is periodically interrupted by a higher flow rate in the range of 30-40, 30-50, or 40-50 mL/min. In another embodiment, a continuous low flow rate in the range of 3-7 mL is periodically interrupted by a higher flow rate in the range of 30-40, 30-50, or 40-50 mL/min.

During the forced flow and recirculation conditions for preparing a biofilm on the anode, planktonic microorganisms (i.e., those having a propensity to float in solution rather than form a biofilm) are substantially removed by a suitable process (e.g., by use of a syringe or flushing into the effluent water). Preferably, any chemicals that may function as mediators are also removed. For example, in a preferred embodiment, planitonic microorganisms are removed by the periodic replacement of all or a portion of the flowing and recirculating anolyte. Since the majority of planktonic microorganisms and any mediators float in solution, periodic replacement of the anolyte functions to remove these species.

In different embodiments for preparing a biofilm on the anode, the anolyte may be replaced, either by a set or arbitrary number of times of equivalent volumes of anolyte, or by a set or arbitrary rate of replacement such that a substantial absence of planktonic microorganisms in the anolyte in contact with the anode is realized. Preferably, a substantial absence of planktonic microorganisms corresponds to at least about 80%, more preferably at least about 85%, more preferably at least about 90%, and even more preferably at least about 95% reduction in concentration of plank-tonic microorganisms in the flowing and recirculating anolyte. For example, in one embodiment, the anolyte is substantially replaced by 1-20 equivalent volumes of anolyte, either at set intervals or in an arbitrary manner. In another embodiment, the anolyte is substantially replaced (i.e., at least 90% replaced by volume for each instance of replacement) at specific intervals, such as every few minutes, hours, or days. Alternatively, the anolyte can be replaced when an optical transmission parameter (property) of the anolyte reaches a level indicative of the presence of planktonic microorganisms. For example, a turbidity analyzer (e.g., by laser scattering) or optical density instrument can be used to measure the relative turbidity or light transmission of the anolyte. In a preferred embodiment, the anolyte is replaced whenever the recirculating anolyte reaches an optical density (e.g., $OD_{600}$) threshold, e.g., above 0.05 units. Replacement of the anolyte can then be stopped when the optical density value no longer exceeds the desired threshold level.

In a preferred embodiment for preparing a biofilm on the anode, anolyte is replaced directly after the anolyte is subjected to a high flow rate pulse. In this case, the high flow rate pulse can be conducted either during recirculation of the anolyte, or alternatively, during a momentary interruption of the recirculation condition for a time sufficient for the high flow rate pulse (and optionally, a simultaneous or subsequent removal of the medium used for the high flow rate pulse) to take place. The medium used in the high flow rate pulse can be the medium being recirculated or can be a separate medium (e.g., water, purified water, buffered water, or mineralized water) not in contact with the recirculated medium. In a particular embodiment, the pressure resulting from the high flow rate pulse is used to force the medium out of an outlet of the anodic chamber so that the medium used in the high rate pulse is immediately ejected from the anodic chamber after the high flow rate pulse.

In one embodiment, the microbes residing on the anode have an innate ability to efficiently consume one or more hydrocarbon compounds known to be present in the effluent. The microbes may, in addition, be capable of consuming non-hydrocarbon compounds or materials that may also be present in the effluent. In such a case, the microbes may be used in the treatment process without first cultivating and enriching the microbes on hydrocarbon-containing anolyte or effluent.

In another embodiment, the initial microbe population may not include a sufficient number of microbes that possess an ability to effectively or efficiently consume hydrocarbon compounds. In such a case, the microbes are preferably cultivated on one or more hydrocarbon compounds as a nutrient source in order to select and enrich those microbes that possess a tendency or ability to consume hydrocarbon compounds. The hydrocarbon compounds selected as a nutrient source are preferably the same (or chemically similar) as the hydrocarbon compounds to be removed from the effluent. By cultivating microbes on hydrocarbon compounds, those microbes having a propensity or inclination to catabolize hydrocarbon compounds undergo a growth stage while microbes not so inclined become weakened by malnutrition and are eventually eliminated from the consortium. In this way, a consortium of microbes enriched in hydrocarbon-consuming microbes is produced.

The above microbial growth and enrichment stage is preferably achieved by contacting a microbe-laden anode with a solution containing one or more hydrocarbon compounds or materials. The hydrocarbon compounds or materials can be administered as a sole nutrient source, or along with other nutritive compounds. Alternatively, the microbes may be initially fed a diet based solely or predominantly on one or more traditional nutritive compounds and thereafter fed a diet more highly concentrated in hydrocarbon compounds. The transition from a diet based predominantly on non-hydrocarbon compounds to one based predominantly on hydrocarbon compounds can be sudden, incremental, or continuously gradual. The non-hydrocarbon nutritive compounds are any compounds or materials that can be oxidatively degraded by exoelectrogenic microorganisms such that electrons and protons result from the degradation. The non-hydrocarbon nutritive compounds can broadly include, for example, waste products (e.g., from sewage streams, industrial pollutants and byproducts, and foodstuffs), synthetic and natural compounds, plastics, and polymers, and biological materials. Typically, the non-hydrocarbon nutritive compounds are biodegradable. The non-hydrocarbon nutritive compounds can be selected from, for example, carboxylic acid-containing compounds or materials (e.g., acetic, propanoic, butyric, valeric, caproic, caprylic, capric, undecanoic, dodecanoic, tridecanoic, and myristic acids, or vegetable- or animal-based fatty acids), carbohydrate compounds or materials (e.g., monosaccharides, disaccharides, oligosaccharides, and polysaccharides), lipid-containing substances (e.g., fats, mono-, di-, or triglycerides, oils, fatty acids, lipoproteins, or liposaccharides), amino acid-containing substances (e.g., amino acids, dipeptides, tripeptides, oligopeptides, or proteins), or a combination thereof. The growth medium can also contain one or more inorganic compounds or materials, such as minerals and vitamins, e.g., alkali and alkaline halide salts (e.g., KCl, $MgCl_2$, and the like), phosphates, ammonium salts, and the like.

The microbial growth stage is preferably conducted by administration of an excess amount of the nutritive source. An excess amount of nutritive source, as used herein, is an amount exceeding the amount required for producing the maximum level of current achievable under the conditions (e.g., resistance, and other factors) provided by the MFC, such that the excess amount can be used by the microorganisms to grow and multiply in numbers. As further described below, an excess amount of nutritive source can be advantageous by encouraging the biofilm microorganisms to store carbon internally during a subsequent state of famine.

The microbial growth stage is preferably continued until an electrical current output of the MFC becomes level at a fixed resistance between the anode and cathode, after which time the organic nutritive compounds can be withheld for a suitable period of time, or periodically administered, in order to maintain a desired current or voltage level. For example, the growth stage may be considered complete when the electrical output of the MFC stabilizes to a voltage between 0.3-0.4 V at a 500 ohm load. Any of the non-hydrocarbon nutritive sources (e.g., sugars) described above can also be used periodically or continuously as a nutritive supplement during the effluent treatment process by the MFC.

The microorganisms (either in biofilm or planktonic form) can also be subjected to a starvation stage. A starvation stage serves two main purposes: i) to enrich the microorganisms with organisms having internally stored carbon by eliminating those organisms that are incapable of internally storing carbon for their cellular maintenance and electricity production during the starvation stage, and ii) to enrich the microorganisms with a higher proportion of exoelectrogenic microorganisms by weakening non-exoelectrogenic organisms and eliminating them. Preferably, the starvation stage is conducted after formation of a biofilm and more preferably after a growth stage, as described above. During the starvation stage, organisms that lack the ability to store carbon internally will weaken and be eliminated due to an absence of a food source for such organisms. Conversely, those organisms having an inclination for carbon storage will thrive under such conditions.

The starvation stage is preferably conducted by lowering the administered amount of organic nutritive compound in the anolyte to below the amount required for the microorganisms to produce the maximum achievable current under the conditions (e.g., resistance, and other factors) provided by the MFC. The amount of nutrient required to produce the maximum achievable current under conditions provided by the MFC is hereinafter referred to as the "nutrient threshold value". Preferably, the administered amount of organic nutritive compound (i.e., nutrient) during the starvation stage is no more than 50% of the amount required to attain the nutrient threshold value. More preferably, the administered amount of nutrient during the starvation stage is no more than 25%, or no more than 10%, or no more than 1%, of the amount required to attain the nutrient threshold value. In a particularly preferred embodiment, the administered amount of organic nutritive compound is substantially eliminated from the anolyte. By being "substantially eliminated" from the anolyte is meant that nutritive organic compounds are not administered in any amount, except that residual amounts of organic nutritive compounds (e.g., generally under 1% of threshold level) may be present. The starvation stage is preferably conducted for a period of time until the biofilm is enriched in microorganisms capable of storing carbon internally. Enrichment of the biofilm with carbon-storing microorganisms is typically evidenced by maintenance of the voltage output of the MEC during the starvation stage. A decline of the voltage occurs when the carbon stores in the microorganisms become depleted to a level under the level required to maintain the voltage. Preferably, after the initial indication of a voltage decline, the starvation stage is ended by administration of an amount of organic nutrient sufficient to at least maintain the voltage of the MFC. However, the starvation stage can be ended before a voltage decline is observed, i.e., at a point in time for which it is known that a certain level of enrichment has occurred.

The microorganisms (either in biofilm or planktonic form) can also be subjected to a decreased electrical resistance stage. Lowering the resistance (i.e., load) across the anode and cathode increases the current flow between the two electrodes, and this in turn encourages the growth of exoelectrogenic organisms (i.e., further enrichment of the microorganisms with exoelectrogenic organisms). Preferably, the electrical resistance is lowered after any of the stages described above for producing a biofilm, and more preferably after the starvation stage described above (and more preferably, with reinitiation of the supply of the organic nutritive compounds). The external electrical resistance is typically the external load that is connected to the MFC. In a first embodiment, the load is a pump. In a second embodiment, the load is an electrosorption unit. In a third embodiment, the load is controlled by use of a resistor box. The resistor box is preferably one which can be set to any suitable resistance, preferably within the range of 0-5000 ohms. The resistance can be reduced by any desirable or suitable amount, either in discrete amounts or gradually over a desired period of time. For example, in different embodiments, the load can be decreased to about 95%, or 90%, or 85%, or 80%, or 75%, or 70%, or 65%, or 60%, or 55%, or 50%, or 45%, or 40%, or 35%, or 30%, or 25%, or 20%, or 15%, or 10%, or 5% its original (of full capacity) value. The MFC, preferably containing a biofilm and optionally pre-processed by one or more of the steps described above, is then contacted with fuiel processing efflu-ent such that microbes residing at the anode oxidatively degrade carbonaceous materials contained therein while producing electricity.

The electrical power output of the MFC in terms of anode surface area (i.e., the area power density) is preferably at least 2,000 mW/m$^2$, and more preferably, at least 2,500 mW/m$^2$, or 3,000 mW/m$^2$, or 3,500 mW/m$^2$, or 4,000 mW/m$^2$, or 4,500 mW/m$^2$. The area power density can be converted to volumetric power densities (in units of W/m$^3$) by multiplying the area power density by the ratio of the projected anode or membrane area to the total volume of the anode (i.e., in m$^2$/m$^3$) and $1/1000$. Discussion and examples of specific surface area have been given above. For lower area to volume ratios, some values of volumetric power density include, for example, 100, 200, 300, 400, 500, 600, 700, 800, 900, or 1,000 W/m$^3$, or a range resulting from any two of these values. For higher area to volume ratios, some values of volumetric power density include, for example, 2,000, 5,000, 10,000, 20,000, 50,000, 100,000, 150,000, or 200,000 W/m$^3$, or a range resulting from any two of these values. Typically, the volumetric power density is recited in terms of net anode volume (NAV), which is the void volume fraction (i.e., volume fraction occupied by liquid) in the anode. To convert the volumetric power density to reflect the NAV, the volumetric power density is divided by the void volume ratio, which has the effect of increasing the value of the volumetric power density. Typically, the NAV is at or above 25% and up to about 95% (i.e., typically any value within 0.25 to 0.95). Some NAV values include, for example, 25%, 30%, 35%, 40%, 45%, 50%, 55%, 60%, 65%, 70%, 75%, 80%, 85%, 90%, and 95%, or values above or below any of these values, or any range resulting from any two of these values.

According to the invention, the electrical power generated by the MFC is directed to (i.e., used to power) an electrosorption mechanism capable of reducing the concentration of one or more inorganic salts (i.e., one or more species of cations and anions). As known in the art, "electrosorption" refers to a process in which oppositely charged electrodes (plates) immersed in a salt-containing solution produce an electric field capable of attracting ions of a charge opposite to each electrode. For example, a suitably charged plate of positive charge will attract anions and a suitably charged plate of negative charge will attract cations. The ions, once collected as an electrical double layer onto the plates, can be eliminated from the solution by any suitable means.

The electrosorption plates can be made of any suitable material with sufficient electrical conductivity. Preferably, the electrosorption plates are highly electrically conductive, i.e., preferably at least about $1.0 \times 10^3$ S.m$^{-1}$, more preferably at least $1.0 \times 10^4$ S.m$^{-1}$, more preferably at least $1.0 \times 10^5$ S.m$^-1$, and more preferably at least $1.0 \times 10^6$ S.m$^{-1}$, (e.g., on the order of aluminum (37.8 $10^6$ S.m$^{-1}$) or copper (59.6 $10^6$ S.m$^{-1}$)). Preferably, the plates are constructed of a carbon material such as activated carbon, carbon fiber, graphitized carbon, or carbon aerogel. Preferably, the electrosorption plates also possess a porous structure with large surface areas (e.g., any of the porosity and specific surface areas described above for the MFC anode) because such characteristics promote and strengthen electrical double layers by reversibly trapping ions in immobile layers near the internal surface of the plates. The electrosorption plates also preferably have suitable hydraulic conductivity values, as also described above. Since the entrapment of ions during electrosorption is mainly due to charge development and neutralization near the surface of the separation agents, the process is reversible; i.e., ions are released from the material once the potential is discontinued. Accordingly, once the surface area of the electrodes is saturated, the electrodes can be easily regenerated by removing the externally applied charge. During the removal of ions from produced water (or desalination) by electrosorption, the externally applied electrical energy is stored and a fraction of this energy can be recovered in the regeneration process of the electrodes.

A preferred electrosorption unit cell is depicted in FIG. 1. As shown in the figure, the electrosorption unit cell can include two half cells preferably containing: a Plexiglas cover (1), a titanium plate (2), a carbon aerogel electrode (3), and a Viton gasket with hole (4). The half cells are preferably separated by a central Plexiglas piece (5) containing a hole for spacing between the two electrodes. A stack of electrosorption unit cells can be assembled together to increase the capacity of the electrosorption unit. The electrosorption unit can also include, for example, a potentiostat (connected to, e.g., working, reference, and counter electrodes), a conductivity meter, and a pump.

In one embodiment, the electrosorption process is non-selective in its ability to remove cations and anions. In another embodiment, the electrosorption process is configured to be selective for the removal of one or more types of cations and anions. The selectivity can be based on, for example, the size and/or oxidation state of the ions. For example, the electrosorption process can be configured to preferentially remove alkali metal salts over other salts, or alkaline earth metal salts over other salts, or heavy metal salts (e.g., having an atomic number of at least 90) over other salts.

The MFC can be connected to the electrosorption unit in any suitable manner that permits electrical power generated by the MFC to drive the electrosorption device. For example, electrical wiring or clips connected with an anode side of the MFC can be connected to one terminal of the electrosorption device while electrical wiring or clips connected with a cathode side of the MFC can be connected to another terminal of the electrosorption device such that the plates of the electrosorption device are oppositely charged. However, the electrical power generated by the MFC need not be transmitted directly to the electrosorption unit. For example, an intermediate electrical storage device (e.g., battery or capacitor) may be used to store electrical energy produced by the MFC for subsequent use by the electrosorption unit. An electrosorption unit typically requires about 1 volt for operation. Such a voltage can generally be provided by a two-MFC stack (e.g., connected in series) or by use of a single MFC and a step-up converter.

In one embodiment, the MFC is tolerant to the total salt concentration of the effluent, and is thus operated in the effluent with no preceding salt-reduction treatment step. The effluent in which the salt-tolerant MFC operates can have a total salt concentration of, or greater than, or less than, for example, 5 g/L, 10 g/L, 20 g/L, 30 g/L, 40 g/L, 50 g/L, 60 g/L, 70 g/L, 80 g/L, 90 g/L, 100 g/L, 120 g/L, 140 g/L, 160 g/L, 180 g/L, 200 g/L, 220 g/L, 240 g/L, 260 g/L, 280 g/L, 300 g/L, 320 g/L, 340 g/L, 360 g/L, or 380 g/L.

In another embodiment, an MFC is either intolerant of a specified salt concentration or functions non-optimally above a specified (i.e., critical) total salt concentration. The MFC can be intolerant of or function non-optimally in a total salt concentration of or less than, for example, any of the values given above for a salt-tolerant MFC. In such a case, measures can be taken to reduce the salt concentration of incoming effluent to a level below the critical salt concentration.

For example, the method can be practiced by having a first MFC (or a first system of MFCs) utilize a non-effluent nutritive source (instead of the effluent), at least initially, in order to operate (power) one or more electrosorption units operating in the effluent. In the case of a salt-intolerant MFC, the non-effluent nutritive source would possess a salt concentration below the critical salt concentration of the MFC. The non-effluent nutritive source can contain any compounds or other materials (as described above) that can function as a nutritive source for the MFC. The effluent emanating from the electrosorption units (the processed effluent) is necessarily reduced in salt concentration, and is thus particularly suitable for processing by a salt-intolerant MFC.

In one embodiment, the effluent emanating from the electrosorption unit (as processed above) is fed back to the first MFC (or system of two or more MFCs) for degradation of the carbonaceous materials therein. The foregoing embodiment is particularly beneficial when the first system of MFCs preferably (e.g., more effectively) operates below a critical salt concentration, since the processed effluent (from the electrosorption unit) is diminished in salt concentration. By having processed effluent being fed back to the MFC, the MFC can then process the effluent without the non-effluent nutritive source, or alternatively, the effluent in combination with any suitable amount of the non-effluent nutritive source. When the non-effluent nutritive source is combined with the effluent, the non-effluent nutritive source may be included, for example, continuously, intermittently, sporadically, or in response to measured or observed conditions. An advantage of a process in which the effluent is continuously processed without the non-effluent nutritive source, is that the process is self-sustained after an initial period of using the non-effluent nutritive source.

In another embodiment, the first MFC (or system of two or more MFCs) operates solely on a non-effluent nutritive source to generate electrical power which is used to operate one or more electrosorption units. The processed effluent emanating from the electrosorption unit is then fed to a different MFC or system of one or more MFCs (e.g., a second system of one or more MFCs) for degradation of the carbonaceous materials therein. The foregoing embodiment is particularly beneficial for a situation in which either the first or second MFC (or system of MFCs), or both, are salt-intolerant or operate more effectively below a critical salt concentration.

In yet another embodiment, the degradation (removal) of organics is performed first by treating the effluent with a first system of one or more MFCs. The electrical power generated therefrom is used to operate one or more electrosorption units, and the processed effluent emanating therefrom is fed to a second system of one or more MFCs. The foregoing embodiment can be particularly beneficial in a situation where the one or more first MFCs are capable of operating in effluent of a given salt concentration, while the one or more second MFCs are salt-intolerant or operate more effectively in effluent having a total salt concentration below a critical salt concentration.

The method can also be practiced by modifying the effluent before or during processing by the MFC. The modification of the effluent can, for example, enhance or promote MFC operation as compared to MFC operation using unmodified effluent. In one embodiment, the effluent is modified by being diluted. Dilution would necessarily have the effect of lowering the salt concentration, which may be advantageous for MFCs that operate more effectively in effluent of lower salt concentration. The salt concentration of the effluent can be lowered to a suitable or desired salt concentration by appropriate dilution. Decreasing of the total salt concentration can be particularly beneficial for a case wherein an MFC is either intolerant of a specified salt concentration or functions non-optimally above a specified total salt concentration.

In another embodiment, the effluent is modified by the addition thereto of nutritive compounds. The additional nutritive source can include, for example, sugars, organic acids, or other nutritive source. In another embodiment, the effluent is modified by concentrating the effluent. In other embodiments, the effluent is modified by filtration, precipitation, oxidation, reduction, electrolysis, or other process. In yet another embodiment, the effluent is processed by two or more of the processes described above.

Figure 2:
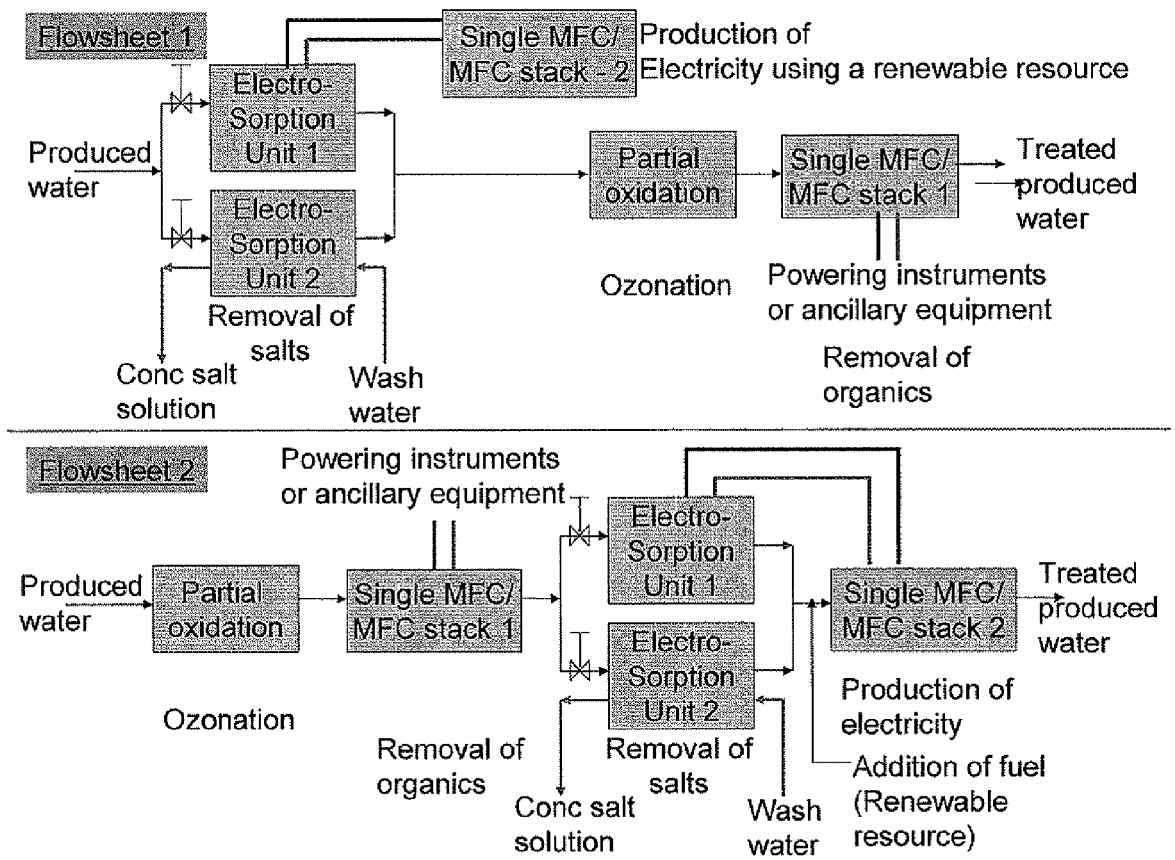
FIG. 2 Schematic diagram showing two preferred embodiments for the MFC-electrosorption treatment process of the invention (Flow sheets 1 and 2).

FIG. 2 includes two schematics depicting two particular process embodiments in which at least two MFCs serve different purposes or operate in a functionally different manner in the effluent treatment process. In Flowsheet 1, one MFC system (i.e., single MFC/IMFC stack-2) is operated on a non-effluent nutritive source and the electrical power derived therefrom used to power one or more electrosorption units (Unit 1 and/or Unit 2). The processed effluent from the electrosorption with is preferably partially oxidized before being fed to a second MFC system (i.e., single MFC/MFC stack 1) and the electrical power derived therefrom used to power one or more of the electrosorption units and/or other ancillary equipment. In Flowsheet 2, the removal of organics is carried out first by one MEC system (i.e., single MFC/MFC stack 1), preferably after a partial oxidation step, and the electrical power derived therefrom used to power one or more of the electrosorption units and/or other ancillary equipment. The processed effluent from the MFC/MFC stack 1 is fed to one or more electrosorption units, and the processed effluent fed to another MFC system (single MFC/MFC stack 2). The process depicted in Flowsheet 2 can be particularly advantageous by permitting operation of the electrosorption unit using effluent having a reduced organic content. Additionally, the process depicted in Flowsheet 2 can be particularly useful for the case in which the single MFC/MFC stack 1 is salt-tolerant and the single MFC/MFC stack 2 is salt intolerant.

Alternatively, the MFC can be operated in a manner such that the cathode of the MFC, instead of producing water by absorption of oxygen, produces hydrogen gas. The hydrogen gas, in turn, can be used as an electricity-generating fuel for powering the electrosorption unit. In order to render the MFC capable of producing hydrogen gas, the MFC is preferably modified in one or more ways, as follows: i) the cathode is preferably constructed of a hydrogen-producing material; ii) the cathode is preferably substantially deoxygenated; and iii) the cell potential of the MFC is preferably adjusted, by application of an external voltage, such that hydrogen can be produced at the cathode. When hydrogen is produced, such a device can be referred to herein as a microbial electrolysis cell (MEC), The hydrogen-producing material of the cathode can be any material capable of producing hydrogen from protons, including, for example, hydrogen-producing metals, such as typically platinum (Pt), palladium (Pd), nickel (Ni), iron (Fe), copper (Cu), or an alloy thereof. Other possible hydrogen-producing materials include hydrogen-producing enzymes or microbes. An anaerobic environment at the cathode may be provided without special measures if the conditions in which the MFC is employed are naturally anaerobic, e.g., by operating substantially below the surface. However, if anaerobic conditions are not naturally present, deoxygenation of the cathode can be conveniently achieved by, for example, sparging of the catholyte with nitrogen (or other inert gas) and/or sealing of the cathodic chamber so as to prevent entry of air. The cell potential ($\Delta V$) can be adjusted such that the MFC anode potential (typically around −0.3 V vs. SHE (standard hydrogen electrode potential)) is externally supplemented such that the potential difference between the anode and the cathode is at least about 0.41 V. For example, the anode can be externally assisted with a voltage of about 0.11 to 0.25 V or higher for this purpose, depending on the magnitude of the cathode overpotential. For hydrogen production, the anolyte and catholyte need not be separated by a cation-selective permeable membrane. Other specifics and modifications known in the art for configuring a microbial fuel cell to operate by producing hydrogen can be found in, for example, U.S. Application Pub. No. 2008/0277272, which is incorporated herein by reference in its entirety.

The produced hydrogen can be used to power the electrosorption device in different ways. For example, the hydrogen can be combusted with a reactive (i.e., oxidizing) gas, or reacted with a gas to produce a fuel which is then combusted, e.g., the physical-, enzymatic-, or microbial-mediated production of methane (natural gas) from syngas (i.e., $CO+H_2$) in order to produce electricity from the combustion. The hydrogen gas can also be used to more directly produce electricity for powering the electrosorption device. For example, the produced hydrogen can be directed into a non-microbial fuel cell (e.g., hydrogen-oxygen fuel cell) capable of reacting hydrogen with a suitable oxidant (typically oxygen) to produce water while generating electricity. The fuel cell can be any suitable fuel cell known in the art capable of reacting hydrogen gas with an oxidant to make electricity. The fuel cell can be, for example, a hydrogen-oxygen proton exchange membrane (PEM) fuel cell, an alkaline fuel cell, metal hydride fuel cell, molten carbonate fuel cell, or solid oxide fuel cell. The fuel cell that uses the produced hydrogen as a fuel can also be a microbial fuel cell capable of using hydrogen as a fuel, i.e., which contains microbes capable of using hydrogen as an energy source for the production of electricity.

The MFC can also be operated in a manner such that one or more electrochemically reducible compounds or materials is reduced at the cathode. Preferably, the cathode of the MFC is operated in the substantial absence of oxygen for this purpose. The reductive process is preferably used for the breakdown or elimination of one or more chemical species that are deleterious to the MFC or that are environmentally malignant. The environmentally malignant species can be, for example, a degradation product, a pollutant, waste product, or toxin. Some examples of reductive processes include nitrate reduction, perchlorate reduction, and heavy metal reduction (Rabaey, K. et al. *The ISME Journal* 1, 9-18 (2007)).

In one embodiment, the reducible species is a compound or material containing a nitrogen oxide (N—O) bond. Such a compound is commonly a nitrate-containing species (i.e., "a nitrate" or "nitrate compound"). The nitrate compounds can include inorganic nitrate species (e.g., $NaNO_3$, $KNO_3$, $NH_4NO_3$, $Mg(NO_3)_2$, $AgNO_3$, $HNO_3$, and so on) as well as organonitrate species, such as tetramethylammonium nitrate. Other types of nitrogen oxide compounds that can be reduced include the nitrites, organonitro compounds, dinitrogen tetroxide, nitrosyl (nitroso) compounds, nitric oxide (NO), and nitrosonium species.

In another embodiment, the reducible species is a compound or material containing a halogen oxide bond. A common class of such compounds are the chlorine oxide class of compounds. A common subclass of chlorine oxide compounds are the perchlorates. The perchlorates include inorganic perchlorate species (e.g., $LiClO_4$, $NaClO_4$, $KClO_4$, $NH_4ClO_4$, $Mg(ClO_4)_2$, $AgClO_4$, $HClO_4$ and so on) as well as organoperchlorate species, such as tetramethylammonium perchlorate. Other subclasses of chlorine oxide compounds include the chlorates, chlorites, hypochlorites, and their acids. Other classes of halogen oxide compounds include the bromine oxide and iodine oxide classes of compounds. Some subclasses of bromine oxide compounds include the perbromates, bromates, bromites, hypobromites, and their acids. Some subclasses of iodine oxide compounds include the periodates, iodates, iodites, hypoiodites, and their acids.

In another embodiment, the reducible species is a compound (e.g., salt) or material containing one or more reducible metal species. A reducible metal species typically contains a metal atom having a positive oxidation state. The reductive method is particularly effective in reducing heavy metals, which are often harmful to the environment and in need of removal. Some examples of reducible metal species include Cr(VI) as found in chromates and dichromates, Mn(VII) as found in permanganates, Fe(III), Ni(III), Cu(II), Cu(I), Pd(II), Ag(I), Cd(II), Au(III), Au(I), Hg(I), Pb(II), and U(VI), which can be converted to the relatively insoluble U(III) species. The more reducible heavy metals can be reduced to elemental form, which can allow for their more facile removal.

In yet another embodiment, the reducible species is a peroxide. The peroxide can be, for example, inorganic (e.g., hydrogen peroxide), or an organoperoxide, such as carbamide peroxide, dibenzoyl peroxide, and cumene hydroperoxide.

In still another embodiment, the reducible species is a reducible sulfurous substance. The sulfurous substance can be, for example, sulfur dioxide, sulfur trioxide, sulfuric acid, a sulfate, a sulfite, a bisulfite, a persulfate (e.g., a peroxodisulfate), or a disulfide.

In one embodiment, a single MFC is adapted to provide electrical power to the electrosorption unit while also diverting a portion of its electrical energy to the reduction of chemical species. In another embodiment, one MFC provides electrical power to the electrosorption unit while another MFC performs a reduction process.

In one embodiment, effluent wastewater from fuel processing is directly fed into the MFC in order to generate electrical power from the oxidative degradation of carbonaceous materials therein. In another embodiment, the effluent wastewater is pre-treated before being fed into the MFC. The pre-treatment step can be any suitable pre-treatment, including, for example, a filtration step, settling step, separation step, pH adjustment step, temperature elevation or reduction step, emulsifying step, precipitation step, or chemical processing step. In a preferred embodiment, an oxidation pre-treatment step (i.e., pre-oxidation treatment step) is employed. An oxidation pretreatment step can be particularly useful for initiating the oxidation of oxidatively resistant (i.e., recalcitrant) carbonaceous compounds, particularly those that are aromatic. By employing the oxidation pre-treatment step, recalcitrant organic compounds that may be difficult or impossible for the microbes to oxidatively degrade can be more easily and more completely degraded. The oxidation pre-treatment step can use any oxidant known in the art capable of oxidizing recalcitrant organic compounds to a level sufficient for further processing by the MFC. Preferably, the oxidant is environmentally benign. The oxidant can be, for example, ozone, a peroxide, a halogen-oxide compound, or nitrogen-oxide compound. Alternatively, the oxidation pre-treatment step is a physical process, such as a thermal, electrolytic, or radiative process. The oxidation process (e.g., ozonation) typically oxidizes the hydrocarbon compound to an oxygen-containing compound, such as an aldehyde, ketone, or carboxylic acid.

The microorganisms (i.e., organisms) that are used in the MFC can be any suitable microorganisms. The microorganism can be, for example, eukaryotic or procaryotic, and either unicellular or multicellular. An example of a suitable unicellular eukaryotic microorganism is yeast. Other examples of unicellular eukaryotic microorganisms include the protists or protozoans, such as amoeba and paramecia. An example of multicellular eukaryotic microorganisms includes the euglena. Those algae capable of uptake of organic carbon (e.g., eukaryotic or procaryotic mixotrophic forms) are also contemplated herein. Procaryotic organisms are predominantly unicellular, and are divided into two domains: the bacteria and the archaea. The procaryotic organisms can also be broadly divided into four main groups according to their shape: the cocci, the bacilli, spirilla, and vibrio. The archaea include the extremophiles (e.g., as found in hot springs and lakes), and the non-extremophiles, as found in soil, the oceans, and marshland. The archaea also include the methanogens.

In one embodiment, the microorganisms considered herein are bacteria. Some examples of phyla of bacteria considered herein are the Acidobacteria, Actinobacteria, Aquificae, Bacteroidetes, Chlorobi, Chlamydiae/Verrucomicrobia, Chloroflexi, Chrysiogenetes, Cyanobacteria, Deferribacteres, Deinococcus-Thermus, Dictyoglomi, Fibrobacteres, Firmicutes, Fusobacteria, Gemmatimonadetes, Nitrospirae, Planctomycetes, Proteobacteria ($\alpha$, $\beta$, $\gamma$, $\delta$ varieties), Spirochaetes, Synergistetes, Tenericutes, Thermodesulfobacteria, Thermotogae, or any combination thereof. Some particularly relevant families of bacteria being considered herein include Acidaminococcaceae, Acidobacteriaceae, Aeromonadaceae, Alteromonadaceae, Clostridiaceae, Comamonadaceae, Desulfobulbaceae, Desulfuromonadaceae, Enterobacteriaceae, Geobacteraceae, Pasturellaceae, Pelobacteraceae, Pseudomonadaceae, Rhodocyclaceae, and Shewanellaceae. Any combination of bacteria containing at least one of the above families of bacteria are also contemplated herein.

In a particular embodiment, the microbes include bacteria from the phylum Firmicutes. Some particular classes of Firmicutes bacteria being considered herein are Bacilli, Clostridia, and Mollicutes. A particular order of Clostridia being considered herein is Clostridiales. Some particular families of Clostridiales being considered herein are Acidaminococcaceae, Clostridaceae, and Veillonellaceae. Some particular genera of Acidaminococcaea or Veillonellaceae being considered herein are Acetonema, Acidaminococcus, Allisonella, Anaeroarcus, Anaeroglobus, Anaeromusa, Anaerosinus, Anaerovibrio, Centipeda, Dendrosporobacter, Dialister, Megamonas, Megasphaera, Mitsuokella, Pectinatus, Pelosinus, Phascolarctobacterium, Propionispira, Propionispora, Quinella, Schwartzia, Selenomonas, Sporomusa, Sporotalea, Succiniclasticum, Succinispira, Thermosinus, Veillonella, and Zymophilus. Some particular genera of Clostridaceae being considered herein are Acetanaerobacterium, Acetivibrio, Acidaminobacter, Alkaliphilus, Anaerobacter, Anaerotruncus, Anoxynatronum, Bryantella, Caldanaerocella, Caloramator, Caloranaerobacter, Caminicella, Candidatus Arthromitus, Clostridium, Coprobacillus, Dorea, Ethanologenbacterium, Faecalibacterium, Garciella, Guggenheimella, Hespellia, Linmingia, Natronincola, Oxobacter, Parasporobacterium, Sarcina, Soehngenia, Sporobacter, Subdoligranulum, Tepidibacter, Tepidimicrobium, Thermobrachium, Thermohalobacter, and Tindallia.

In another particular embodiment, the microbes include one or more classes of bacteria from the phlyum Proteobacteria.

A particular class of Proteobacteria being considered herein is Alpha Proteobacteria. Some particular orders of Alpha Proteobacteria being considered herein are Caulobacterales (e.g., the family Caulobacteraceae, or *Caulobacter* sp.), Kordiimonadales, Parvularculales, Rhizobiales (e.g., the family Riizobiaceae, or *Rhizobium* sp.), Rhodobacterales, Rhodospirillales (e.g., the family Acetobacteraceae, or *Acetobacter* sp.), Rickettsiales (e.g., the family Rickettsiaceae, or *Rickettsia* sp.), and Sphingomonadales (e.g., the family Sphingomonadaceae, or *Spphingomonas* sp.), wherein "sp." or "spp." as used herein both indicate one or more species of the indicated genus.

Another particular class of Proteobacteria being considered herein is Beta Proteobacteria. Some particular orders of Beta Proteobacteria being considered herein are Burkholderiales, Hydrogenophilales, Methylophilales, Neisseriales (e.g., the family Neisseriaceae, or *Neisseria* sp.), Nitrosomonadales, Rhodocyclales, and Procabacteriales. A particular family of Burkholderiates being considered herein is Comamonadaceae. Some particular genera of Comamonadaceae being considered herein are Acidovorax, Aquabacterium, Brachymonas, Comamonas, Curvibacter, Delffia, Hydrogenophaga, Ideonella, Leptothrix, Malikia, Pelomonas, Polaromonas, Rhodoferax, Roseateles, Sphaerotilus, Tepidimonas, Thiomonas, and Variovorax. A particular family of Rhodocyclales being considered herein is Rhodocyclaceae. A particular genus of Rhodocyclaceae being considered herein is Azospira.

Another particular class of Proteobacteria being considered herein is Gamma Proteobacteria. Some particular orders of Gamma Proteobacteria being considered herein are Acidithiobacillales, Aeromonadales, Alteromonadales, Cardiobacteriales, Chromatiales (purple sulfur bacteria), Enterobacteriales (e.g., the family Enterobacteriaceae, such as the genera *Escherichia* or *Salmonella*), Legionellales (e.g., the family Legionellaceae, or *Legionella* sp.), Methylococcales, Oceanospirillales, Pasteurellales (e.g., the family Pasteurellaceae, or *Haemophilus* sp.), Pseudomonadales, Thiotrichales (e.g., Thiomargarita), Vibrionales (e.g., the family Vibrionaceae, or *Vibrio* sp.), Xanthomonadales (e.go, the family Xanthomonadaceae, or *Xanthomonas* sp.). A particular family of Aeromonadales being considered herein is Pseudomonadaceae. A particular genus of Pseudomonadaceae being considered herein is Pseudomonas (e.g., *P. aeruginosa*). Some particular families of Alteromonadales being considered herein are Shewanellaceae and Pseudoalteromonas. A particular genus of Shewanellaceae being considered herein is Shewanella (e.g., *S. putrefaciens*).

Another particular class of Proteobacteria being considered herein is Delta Proteobacteria. Some particular orders of Delta Proteobacteria being considered herein are Aeromonadales, Bdellovibrionales (e.g., the family Bdellovibrionaceae, or *Bdellovibrio* sp.), Desulfobacterales, Desulfovibrionales, Desulfurellales, Desulfarcales, Desulfuromonadales, Myxococcales (Myxobacteria), and Syntrophobacterales. A particular family of Aeromonadales being considered herein is Aeromonadaceae. A particular genus of Aeromonadaceae being considered herein is *Aeromonas*. Some particular families of Desulfuromonadales being considered herein are Desulfuromonadaceae, Pelobacteraceae, and Geobacteraceae. A particular genus of Desulfaromonadaceae being considered herein is *Desulfuromonas*. A particular genus of Geobacteraceae being considered herein is *Geobacter* (e.g., *Geobacter sulfurreducens* and *Geobacter metallireducens*). A particular family of Desulfobacterales being considered herein is Desulfobulbaceae. A particular genus of Desulfobulbaceae being considered herein is *Desulfobulbus*.

Another particular class of Proteobacteria being considered herein is Epsilon Proteobacteria. Some particular orders of Epsilon Proteobacteria being considered herein are Campylobacterales (e.g., the family Helicobacteraceae, or *Helicobacter* sp.) and Nautiliales.

In another particular embodiment, the microbes include one or more bacteria from the phlyum Acidobacteria. A particular order of Acidobacteria being considered herein is Acidobacteriales. A particular family of Acidobacteriales being considered herein is Acidobacteriaceae. Some particular genera of Acidobacteriaceae being considered herein are *Acidobacterium, Geothrix, Holophaga*, and *Chloracidobacterium*.

In another particular embodiment, the microbes include one or more thermophilic bacteria from the order Thermotogales. Some particular genera of Thermotogales being considered herein are *Thermotoga, Caldotoga, Fervidobacterium, Geotoga, Marinitoga, Petrotoga, Thermopallium*, and *Thermosipho*. A related family of thermophilic bacteria being considered herein is Thermoanaerobiaceae. Some particular genera of Thennoanaerobiaceae being considered herein are *Thermoanaerobacter* and *Thermoanaerobacterium*. Some particular species of Thermoanaerobacter being considered herein are *Thermoanaerobacter thermohydrosulfuricus, Thermoanaerobacter subterraneus, Thermoanaerobacter brockii, Thermoanaerobacter yonseiensis*, and *Thermoanaerobacter tengcongensis*.

In another embodiment, the microorganisms considered herein are archaea. Some examples of phyla of archaea considered herein are the Crenarchaeota, Euryarchaeota, Korarchaeota, and Nanoarchaeota. Several classes of archaea are methanogens, e.g., Methanomicrobia, Methanobacteria, Methanococci, and Methanopyri. Preferably, methanogens are not used in the method due to their propensity for producing methane and their general lack of ability to function as exoelectrogenic organisms. However, methanogens that can function as exoelectrogenic organisms may be used in the method if they are used under conditions that prevent methane production.

The microbes used in the MFC can be selective or non-selective with respect to oxidative degradation of hydrocarbon or other carbonaceous compounds. For example, a consortium or species of microbes may be used which is generally non-selective in its ability to oxidatively degrade hydrocarbon compounds, i.e., the microbes can oxidatively degrade a wide number of different hydrocarbon compounds. A consortium or species of microbes may also be somewhat selective in processing hydrocarbon compounds in that the microbes may oxidatively degrade one or more types of hydrocarbon compounds more efficiently or effectively than one or more other types of hydrocarbon compounds. Finally, a consortium or species of microbes may be highly selective in processing one or more specific hydrocarbon compounds while being essentially inefficient or ineffective in processing one or more other hydrocarbon compounds.

In one embodiment, a population of microbes incorporated into the MFC is relatively homogeneous by having a predominant proportion of the microbe population (typically at least 90%, 95%, 97%, 98%, or 99%) within a particular class, order, family, genus, or species of microorganism. In another embodiment, a population of microbes incorporated into the MFC is relatively heterogeneous (i.e., a consortium of microbes). A relatively homogeneous or heterogeneous sample of microbes can be obtained by any method known in the art, including as a purified culture (i.e., as prepared by cell culturing methods) or from a non-cultured source. Some examples of non-cultured sources from which a population of microbes can be obtained for the MFC include, for example, a waste stream (e.g., municipal or industrial waste streams), top soil, hot spring, estuary, deep sea vent, underground environment, highly saline environment, or a contaminated environment (e.g., oil- or hydrocarbon-contaminated environment).

In one embodiment, a single MFC is capable of oxidatively degrading a wide number of hydrocarbon compounds, thereby enabling the MFC to remove the majority (or all) of the different types of hydrocarbon compounds that may be present in the effluent. The single MFC may also be a single system of MFCs, all having the same ability to degrade the same types of hydrocarbon compounds. In another embodiment, a multiplicity of MFCs (ide., two or more), each containing microbes that are specialized for degrading specific hydrocarbon or other carbonaceous compounds, are used in the process to remove the majority (or all) of the different types of hydrocarbon compounds that may be present in the effluent.

While there have been shown and described what are at present considered the preferred embodiments of the invention, those skilled in the art may make various changes and modifications which remain within the scope of the invention defined by the appended claims.

What is claimed is:

1. A method for cleansing fuel processing effluent containing carbonaceous compounds and inorganic salts, wherein at least a portion of said carbonaceous compounds includes one or more hydrocarbon compounds, the method comprising (i) contacting the fuel processing effluent with an anode of a microbial fuel cell, said anode containing microbes thereon which oxidatively degrade one or more of said carbonaceous compounds while producing electrical energy from said oxidative degradation, and (ii) directing processed effluent from said microbial fuel cell to an electrosorption device while directing said electrical energy to drive said electrosorption device that operates on said processed effluent, to reduce a concentration of one or more inorganic salts in said processed effluent, wherein said anode is in electrical communication with a cathode of the microbial fuel cell.

2. The method of claim 1, wherein said microbes are in the form of a biofilm on said anode.

3. The method of claim 1, wherein said carbonaceous compounds include one or more hydrocarbon compounds selected from the group consisting of benzene, toluene, xylenes, and polycyclic hydrocarbons.

4. The method of claim 1 wherein the fuel processing effluent is subjected to a pre-oxidation treatment step before being treated by the microbial fuel cell.

5. The method of claim 4, wherein the pre-oxidation treatment step uses ozone as an oxidant.

6. The method of claim 1, wherein said anode comprises a form of elemental carbon.

7. The method of claim 1, wherein the cathode of said microbial fuel cell is a Pt/air electrode.

8. The method of claim 1, wherein the cathode of said microbial fuel cell is operated under substantially anaerobic conditions.

9. The method of claim 1, wherein the microbial fuel is operated such that hydrogen gas is produced at the cathode by operating the microbial fuel cell with the cathode constructed of a hydrogen-producing material and under deoxygenated conditions, and a cell potential of the microbial fuel cell is adjusted by application of an external voltage such that hydrogen is produced at the cathode, wherein the resulting hydrogen gas is used as an electricity-generating fuel to power the electrosorption device.

10. The method of claim 9, wherein said hydrogen is processed in a hydrogen-oxygen fuel cell to convert the hydrogen to electricity.

11. The method of claim 1, wherein the microbial fuel is operated such that the cathode electrochemically reduces one or more electrochemically reducible species other than hydrogen ions.

12. The method of claim 11, wherein said electrochemically reducible species includes one or more electrochemically reducible metal cations.

13. The method of claim 1, wherein a non-effluent nutritive source is added to the effluent in order to maintain electrical production by the microbial fuel cell.

14. The method of claim 1, wherein processed effluent emanating from said electrosorption device is fed to a same or different microbial fuel cell.

15. The method of claim 14, wherein said different microbial fuel cell operate more effectively in effluent having a salt concentration below the salt concentration of said fuel processing effluent.

16. The method of claim 1, wherein a cation-selective permeable material separates an anode region which contains the anode from a cathode region which contains the cathode.

17. The method of claim 1, wherein the cathode of said microbial fuel cell is a biocathode.

* * * * *